US010571628B2

(12) United States Patent
Bookbinder et al.

(10) Patent No.: US 10,571,628 B2
(45) Date of Patent: Feb. 25, 2020

(54) LOW LOSS OPTICAL FIBER WITH CORE CODOPED WITH TWO OR MORE HALOGENS

(71) Applicant: Corning Incorporated, Corning, NY (US)

(72) Inventors: Dana Craig Bookbinder, Corning, NY (US); Steven Bruce Dawes, Corning, NY (US); Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/193,819

(22) Filed: Nov. 16, 2018

(65) Prior Publication Data

US 2019/0154911 A1     May 23, 2019

Related U.S. Application Data

(60) Provisional application No. 62/588,594, filed on Nov. 20, 2017.

(51) Int. Cl.
*G02B 6/028* (2006.01)
*G02B 6/036* (2006.01)

(52) U.S. Cl.
CPC ....... *G02B 6/0281* (2013.01); *G02B 6/03627* (2013.01)

(58) Field of Classification Search
CPC .. G02B 6/0288; G02B 6/0365; G02B 6/0281; G02B 6/03627; G02B 6/028; G02B 6/02
See application file for complete search history.

(56) References Cited

U.S. PATENT DOCUMENTS

| | | |
|---|---|---|
| 5,410,567 A | 4/1995 | Brundage et al. |
| 6,027,062 A | 2/2000 | Bacon et al. |
| 7,565,820 B2 | 7/2009 | Foster et al. |
| 7,832,675 B2 | 11/2010 | Bumgarner et al. |
| 9,020,316 B2 | 4/2015 | Bookbinder |
| 9,618,692 B2 | 4/2017 | Berkey et al. |
| 9,802,858 B2 | 10/2017 | Bookbinder et al. |
| 2004/0240814 A1 | 12/2004 | Boek et al. |
| 2012/0192593 A1* | 8/2012 | Haruna ............. C03B 37/01211 65/430 |

(Continued)

FOREIGN PATENT DOCUMENTS

| | | |
|---|---|---|
| EP | 139532 A2 | 5/1985 |
| EP | 0479120 B1 | 9/1991 |

(Continued)

OTHER PUBLICATIONS

International Search Report and Written Opinion PCT/US2018/061947 dated Feb. 20, 2019, 14 Pgs.

*Primary Examiner* — Jennifer Doan
(74) *Attorney, Agent, or Firm* — Smit Kapadia; Robert L. Carlson

(57) ABSTRACT

A co-doped optical fiber is provided having an attenuation of less than about 0.17 dB/km at a wavelength of 1550 nm. The fiber includes a core in the fiber having a graded refractive index profile with an alpha of greater than 5. The fiber also includes a cladding in the fiber that surrounds the core addition, the core includes silica that is co-doped with two or more halogens.

26 Claims, 2 Drawing Sheets

(56) References Cited

U.S. PATENT DOCUMENTS

2014/0241684 A1  8/2014  Bookbinder et al.
2017/0176673 A1  6/2017  Berkey et al.

FOREIGN PATENT DOCUMENTS

WO  2007149344 A1  12/2007
WO  2016086013 A1   6/2016
WO  2016168042 A1  10/2016

* cited by examiner

LOW LOSS OPTICAL FIBER WITH CORE CODOPED WITH TWO OR MORE HALOGENS

CROSS-REFERENCE TO RELATED APPLICATIONS

This application claims the benefit of priority under 35 U.S.C. § 119 of U.S. Provisional Application No. 62/588,594, filed Nov. 20, 2017, the content of which is incorporated herein by reference in its entirety.

BACKGROUND

The disclosure generally relates to low cost, low attenuation optical fibers for data transmission and, more particularly, relates to fiber designs with co-doped cores.

Low attenuation (e.g., a fiber having an attenuation value of ≤0.17 dB/km) is an important characteristic of optical fibers configured to efficiently transmit data.

Fiber nonlinearity is also a factor limiting the performance of optical fibers used in high speed, long haul transmission applications. In general, fiber nonlinearity can be reduced by increasing the effective area of the fiber. This is because power density is inversely proportional to the effective area. While some fiber designs configured for single mode operation have focused on increasing the effective area, the effective area achieved by these designs has been limited by micro- and macro-bending losses. With recent advances in digital signal processing (DSP), linear impairment to transmission systems (e.g., chromatic dispersion and polarization mode dispersion (PMD)), is not a significant problem.

Multiple mechanisms can contribute to the attenuation and loss characteristics in optical fibers. These mechanisms can include Rayleigh scattering, small-angle scattering, metals and impurity-related absorption effects, and other UV and IR-related effects.

SUMMARY

According to one embodiment a single mode optical fiber comprises: a core having a graded refractive index profile with an alpha of less than 5; and a cladding surrounding the core, the cladding comprising a depressed cladding region and an outer cladding region in contact with and surrounding the depressed cladding region;

wherein the core has a relative refractive index of greater than +0.25% compared to that of the outer cladding region, wherein the core region comprises silica co-doped with a first halogen and a second halogen, wherein the concentrations of said first and said second halogen within the core are non-uniform, such that:

(a) the ratio of maximum and minimum concentration of the first halogen in the core is at least 3, (b) the ratio of maximum and minimum concentration of the second halogen in the core is at least 3, (c) the concentration within the core of one halogen increases as distance from the center of the core increases; and (d) the concentration within the core of the other halogen decreases as distance from the center increases; wherein (e) the fiber has an attenuation of less than about 0.17 dB/km at a wavelength of 1550 nm.

According to some embodiments the ratio of maximum and minimum concentration of the first halogen in the core is at least 10. According to some embodiments the ratio of maximum and minimum concentration of the second halogen in the core is at least 10.

According to some embodiments, the ratio of maximum and minimum concentration of the second halogen in the core is at least 10.

According to some embodiments first halogen is chlorine (Cl) or bromine (Br), and the second halogen is fluorine (F).

According to some embodiments, the ratio of maximum and minimum concentration of chlorine (or bromine) in the core is at least 3, for example at least 10. According to some embodiments the ratio of maximum and minimum concentration of chlorine (or bromine) in the core is less than 1000.

According to some embodiments, the ratio of maximum and minimum concentration of fluorine in the core is at least 5, for example, at least 10. According to some embodiments the ratio of maximum and minimum concentration of chlorine in the core is less than 1000. According to some embodiments the ratio of concentration of chlorine (or bromine) to fluorine at the center of the core is between 3 and 1000.

One aspect of the present disclosure relates to a single mode optical fiber having an attenuation of less than about 0.17 dB/km at a wavelength of 1550 nm. The fiber includes a core in the fiber having a graded refractive index profile with an alpha of less than about 5. The fiber also includes a cladding in the fiber that surrounds the core. Further, according to some embodiments the core has a maximum relative refractive index $\Delta_{1Max}$ of greater than 0.05% (e.g., 0.3% to 0.55%), compared to the silica. In addition, the core includes silica that is co-doped such that the concentrations of fluorine and chlorine within the core are non-uniform and:

(a) difference between maximum and minimum concentration of chlorine in the core is at least 0.4 wt %, (b) difference between maximum and minimum concentration of fluorine in the core is at least 0.45 wt %, (c) the maximum amount of chlorine in the core is at least 0.7 wt %, and (d) the maximum of fluorine in the core is at least 0.75 wt.

Another aspect of the present disclosure relates to a single mode optical fiber including a fiber having an attenuation of less than about 0.17 dB/km at a wavelength of 1550 nm. The fiber includes a core in the fiber that comprises silica co-doped with fluorine and chlorine; and a cladding that surrounds the core region. Further, the core has a graded refractive index profile having an alpha less than 5, for example 1.8 to 3, or 1.8 to 2.2. In addition, the cladding includes a depressed index cladding region (also referred to as a depressed cladding region herein) having a relative refractive index that is lower than the relative refractive index of the core and that of the outer cladding region.

In certain implementations of the foregoing optical fibers, the cladding includes a depressed region having a relative refractive index that is lower than the relative refractive index of the core. For example, in some embodiments, the relative refractive index of the depressed region is at least 0.4% less than the maximum relative refractive index of the core. According to one aspect, the relative refractive index difference between the core and the outer cladding region is between 0.3% and 0.5%. In some other embodiments, the relative refractive index difference between the core and the outer cladding region is between 0.3% and 0.65%

According to some embodiments the cladding includes a depressed region having a relative refractive index that is substantially constant and lower than a maximum relative refractive index of the core. In addition, the fiber has an attenuation of less than about 0.17 dB/km at a wavelength of 1550 nm.

In further aspects of the disclosure, the optical fibers having a co-doped core can exhibit an attenuation of less than about 0.16 dB/km, and certain of these fibers also possess attenuation levels as low as about 0.15 dB/km or even less, as measured at a wavelength of 1550 nm.

In certain aspects of the disclosure, the co-doped optical fibers have silica cores that are co-doped with fluorine and chlorine such that the difference between maximum and minimum concentration of chlorine in the core is at least 1 wt % (e.g., at least 2 wt %, or at least 3 wt %), and/or the ratio of maximum and minimum concentration of chlorine in the core is at least 3 (e.g., at least 10, or even 100, 3 to 1000, 5 to 1000, or 5 to 100).

In certain aspects of the disclosure, the co-doped optical fibers have silica cores that are co-doped with fluorine and chlorine such that the difference between maximum and minimum concentration of fluorine in the core is at least 1 wt % (e.g., at least 2 wt %, or at least 3 wt %), and/or the ratio of maximum and minimum concentration of fluorine in the core is at least 5 (e.g., at least 10, at least 100, or 3 to 1000, 5 to 1000, or 5 to 100).

According to one embodiment a single mode optical fiber comprises:

a core having a graded refractive index profile with an alpha of less than 5; and a cladding surrounding the core, wherein the core has a relative refractive index of greater than +0.05% compared to pure silica, wherein the core comprises silica co-doped with chlorine and fluorine, wherein the concentrations of fluorine and chlorine within the core are non-uniform, such that:

(a) difference between maximum and minimum concentration of chlorine in the core is at least 0.4 wt %, (b) difference between maximum and minimum concentration of fluorine the core is at least 0.45 wt %, (c) the maximum amount of chlorine in the core is at least 0.7 wt %, and (d) the maximum of fluorine in the core is at least 0.75 wt; wherein the fiber has an attenuation of less than about 0.17 dB/km at a wavelength of 1550 nm.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
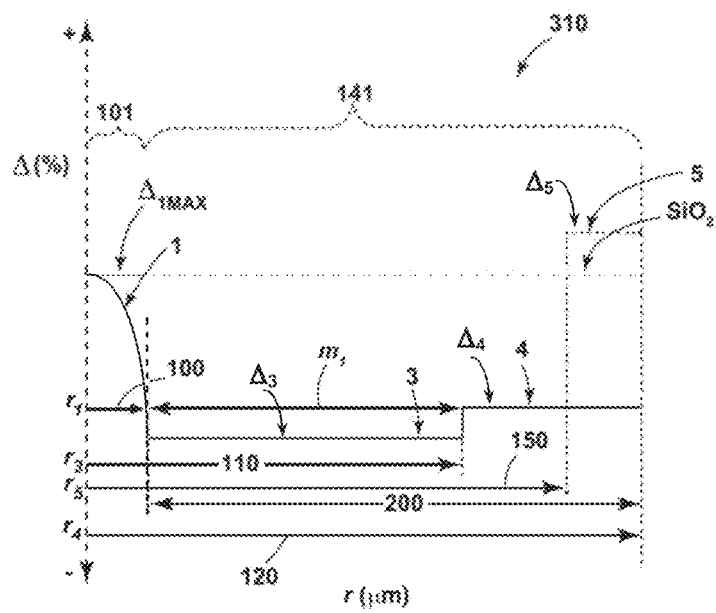
FIG. 1 is a schematic diagram that depicts refractive index as a function of fiber radius for an optical fiber with a co-doped core and a cladding.

Reference will now be made in detail to the present preferred embodiments, examples of which are illustrated in the accompanying drawings. Whenever possible, the same reference numerals will be used throughout the drawings to refer to the same or like parts.

The "refractive index profile" is the relationship between refractive index or relative refractive index and fiber radius.

The terms "μm" and "micron" are used interchangeably herein.

The "relative refractive index percent" is defined in Equation (1) below as:

$$\Delta\% = 100 \times (n_i^2 - n_c^2)/2n_i^2 \tag{1}$$

where $n_c$ is the refractive index of undoped silica and $n_i$ is the average refractive index at point i in the particular region of the optical fiber.

As further used herein, the relative refractive index is represented by Δ and its values are given in units of "%", unless otherwise specified. The terms Δ, % Δ, Δ %, delta index, percent index, percent delta index and % can be used interchangeably herein. In cases where the refractive index of a region is less than the refractive index of undoped silica, the relative index percent is negative and is referred to as having a depressed region or depressed index. In cases where the refractive index is greater than the refractive index of undoped silica, the relative index percent is positive. An "up-dopant" is herein considered to be a dopant which has a propensity to raise the refractive index relative to pure undoped silica. A "down-dopant" is herein considered to be a dopant which has a propensity to lower the refractive index relative to pure undoped silica. Examples of up-dopants include $GeO_2$, $Al_2O_3$, $P_2O_5$, $TiO_2$, Cl, and Br. Examples of down-dopants include F and B.

"Chromatic dispersion," herein referred to as "dispersion" unless otherwise noted, of an optical fiber is the sum of the material dispersion and the waveguide dispersion. Zero dispersion wavelength is a wavelength at which the dispersion has a value of zero. Dispersion slope is the rate of change of dispersion with respect to wavelength.

"Effective area" is defined in Equation (2) as follows:

$$A_{eff} = 2\pi \left[ \frac{\left( \int f^2 r dr \right)^2}{\int f^4 r dr} \right] \tag{2}$$

where the integration limits are 0 to ∞, f is the transverse component of the electric field associated with light propagated in the waveguide (i.e., optical fiber), and r is the radius of the fiber. As used herein, "effective area" or "$A_{eff}$" refers to optical effective area at a wavelength of 1550 nm (i.e., the fundamental mode) unless otherwise noted.

The term "alpha" or "α-profile" refers to a relative refractive index profile, expressed in terms of Δ(r). Δ(r) is in units of "%," where r is radius, and follows Equation (3) as follows:

$$\Delta(r) = \Delta_{1max}\left[1 - \left(\frac{r}{r_1}\right)^\alpha\right] \qquad (3)$$

where $\Delta_{1max}$ is the peak refractive index change in the center of the fiber (i.e., core delta), and $r_1$ is the core radius. Alpha as reported herein is measured at 1550 nm. An α=1 corresponds to a triangular relative refractive index profile, an α of 1.5<α<5 corresponds to a strongly graded index profile, where an α=2 describes a parabolic profile, and α>12 corresponds to a profile approaching a step index (i.e., a "step-like index profile" as used herein) profile. The mode field diameter (MFD) is measured using the Peterman II method as understood in the field of this disclosure according to Equation (4) as follows:

MFD=2w; and $$w^2 = 2\frac{\int f^2 r\, dr}{\int \left(\frac{df}{dr}\right)^2 r\, dr} \qquad (4)$$

where w is the mode field radius, and the integral limits are 0 to ∞. Unless otherwise noted, MFD at 1310 nm is from about 8.2 μm to about 9.5 μm and about 9.0 μm to about 12 μm for G.652 and G.654 co-doped optical fiber configurations according to the disclosure, respectively. MFD at 1550 nm is from about 9.0 μm to about 11 μm and about 9.0 μm to about 14 μm for G.652 and G.654 co-doped optical fiber configurations according to the disclosure, respectively.

$V_3$ is the volume of the moat region defined by the following relation:

$$V_3 = \int_{r_2}^{r_3} |\Delta_{3-4}| r\, dr$$

wherein $\Delta_{3-4}$ is the difference between the relative refractive index between the inner cladding region and the outer cladding region.

The "theoretical fiber cutoff wavelength," "theoretical fiber cutoff," or "theoretical cutoff," for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength," also known as the "2 m fiber cutoff" or "measured cutoff." The FOTP-80 standard test is performed to either strip out the higher order modes using a controlled amount of bending, or to normalize the spectral response of the fiber to that of a multi-mode fiber.

A "cable cutoff measurement," as used herein, is performed using the standard 22 m test described in EIA-455-170 Cable Cutoff Wavelength of Single-mode Fiber by Transmitted Power, or "FOTP-170."

Unless otherwise noted herein, optical properties (such as dispersion, attenuation, etc.) are reported for the $LP_{01}$ mode.

The "effective group refractive index," also known as the "group index" ($n_{geff}$), is the ratio of the velocity of light, c, to the group velocity, $v_g$, as given below by Equation (5):

$$n_{geff} = \frac{c}{v_g} \qquad (5)$$

The mathematical expression for $v_g$ of a guided mode in the fiber in terms of electromagnetic field, refractive index, wavelength and propagation constant, derives from Maxwell's equations, or, more particularly, from the scalar wave equation. The group velocity $v_g$ is defined below in Equation (6):

$$v_g = \frac{\partial \omega}{\partial \beta} \qquad (6)$$

where ω is the wave's angular frequency, and β is the propagation constant of a guided mode. The propagation constant β, also called the effective refractive index, is an electromagnetic field parameter related to field propagation velocity and is found by solving the scalar wave equation for a selected waveguide. Because β depends upon waveguide geometry, one may expect that bending the waveguide will change β. See, e.g., U.S. Pat. No. 6,134,367 at 3:14-29, hereby incorporated by reference within this disclosure.

Doping of an optical fiber core (e.g., a core containing a silica-based glass composition) generally decreases the fictive temperature of the glass as suitable dopants introduced into the core on an individual basis tend to reduce the viscosity of the glass. Many of the dopants that reduce the fictive temperature of the glass also tend to increase concentration fluctuations in the core, contributing to increased Rayleigh scattering effects. Accordingly, only a few dopants can be used to lower the fictive temperature of the glass without significantly introducing concentration fluctuations such that a net lower attenuation can be obtained for the doped optical fiber.

The optical fiber designs outlined in this disclosure are configured with cores co-doped with two or more halogens and having graded refractive index profiles (with core alpha ≤5) that result in low loss optical fibers in view of the foregoing principles and considerations including, but not limited to, Rayleigh scattering effects. As used herein, "co-doping" refers to the introduction of two or more halogen dopants into the core of an optical fiber. In some embodiments, the co-doped halogens in the core are fluorine and chlorine. In some other embodiments, the co-doped halogens in the cores are chlorine and bromine. In still other embodiments, the co-doped halogens in the core are bromine and fluorine. Optical fiber configurations with co-doped cores, and the methods to develop such co-doped cores, result in appreciable reductions in the viscosity of the core, Rayleigh scattering effects and, ultimately, fiber attenuation.

Low attenuation levels can be obtained with the co-doped fibers according to aspects of the disclosure. In particular, attenuation levels at 1550 nm of less than about 0.18 dB/km and, in some embodiments, less than about 0.17 dB/km can be obtained by co-doping the core of these fibers. Even lower attenuation levels of less than about 0.16 dB/km, and less than about 0.15 dB/km can be obtained according to some co-doped fiber embodiments. The co-doping of the core with both fluorine and chlorine results in low viscosity levels in the core. These low viscosity levels contribute to a reduction in the fictive temperature and density fluctuations within the core, thereby reducing Rayleigh scattering effects. Additionally, the addition of chlorine and fluorine dopants in the fiber results in a minimal increase in the concentration fluctuations within the cores of these fibers, a further contribution to the low attenuation levels observed in these optical fibers.

In some embodiments, the co-doped halogens in the core are fluorine and chlorine. In some other embodiments, the co-doped halogens in the cores are chlorine and bromine. In still other embodiments, the co-doped halogens in the core are bromine and fluorine. The co-doped optical fiber designs outlined in this disclosure can also be optimized for low attenuation performance—by having a core that is a $GeO_2$-limited $SiO_2$ core or that is free of $GeO_2$, and that is co-doped with at least two halogens and has a refractive index profile that is graded index with a core alpha of less than or equal to 5. A Germania-limited or Germania free core in the optical fiber can improve the attenuation performance of the optical fiber by reducing the effects of Rayleigh scattering. By "$GeO_2$-limited $SiO_2$ core" as used herein, it is meant that the fibers contain less than about 1.0 wt. % of $GeO_2$ or GeO, alone or in combination. Preferably, the co-doped fibers disclosed herein contain less than about 0.5 wt. %, and more preferably less than about 0.1 wt. % of $GeO_2$ or GeO, alone or in combination. In certain co-doped optical fiber implementations, the concentrations of $GeO_2$ and/or GeO can approach, or be set, to zero.

In some embodiments, the co-doped core of the optical fibers includes fluorine- and chlorine-doped silica. In some other embodiments, the co-doped halogens in the cores are chlorine and bromine. In still other embodiments, the co-doped halogens in the core are bromine and fluorine. In some other embodiments, the co-doped halogens in the cores are chlorine and bromine and fluorine. The core of the fibers disclosed herein may additionally include one or more of potassium oxide and phosphorous pentoxide. Such fibers which have low amounts of $GeO_2$ and GeO in their respective cores can exhibit even lower attenuation levels due to less Rayleigh scattering contributions. More improvements in attenuation can be realized by optimizing the fluorine and chlorine dopant profile in a $GeO_2$-limited $SiO_2$ core.

It is preferred that the co-doped fibers of this disclosure have an outer cladding diameter of between about 80 microns and about 150 microns. In some aspects, the co-doped fibers may have an outer cladding diameter of between about 120 microns and about 130 microns. Certain preferred embodiments of the fibers have an outer cladding diameter of about 125 microns.

Preferably, the co-doped core of these fibers can possess a graded refractive index profile with an alpha less than 5, or less than about 3 in some cases. A graded refractive index core with an alpha less than 5 helps in reducing the small angle scattering contribution to the optical fiber attenuation. A graded refractive index core also allows for the optical fiber to be manufactured in a reduced number of steps and lower manufacturing cost. The reduced number of process steps and manufacturing cost is achieved for a graded refractive index core profile, and the optical fiber meets the G.652 compliant dispersion properties (zero dispersion wavelength) even when the inner cladding is adjacent to the optical fiber core. In some embodiments the co-doped core (2 or more different halogen dopants) of these fibers can possess a graded refractive index profile with an alpha between 1.5 and 3, for example between 1.8 and 3, between 1.5 and 2.5, or between 1.8 and 2.3. According to some embodiments the fiber comprises fluorine and chlorine doped in a $GeO_2$-limited core to provide the graded index. Optionally, $K_2O$ and/or $P_2O_5$ dopants may be introduced in the core for added optical performance benefits.

The exemplary fiber embodiments reduce the coefficient of thermal expansion-related (CTE) mismatch within the core and between the core and cladding, which can reduce internal stresses in the core, leading to better fiber attenuation characteristics.

The alpha profile in the co-doped core graded index core can be achieved using various methods. One approach relies on a non-uniform consolidation technique for doping with fluorine in a graded index. The non-uniform consolidation technique relies on outside vapor deposition (OVD) and vapor-phase axial deposition (VAD) methods. A second approach relies on a modified chemical vapor deposition (MCVD) approach. A third approach relies on a plasma-assisted chemical vapor deposition (PCVD) approach. In MCVD and PCVD approaches, the optical fiber core is made by layer-by-layer glass deposition, and the processes used to dope each layer can be independently controlled.

According to some embodiments, in an OVD or VAD soot to glass process, the graded index refractive index profile is achieved by doping with at least two halogens during the preform consolidation and/or doping step of the optical fiber preform manufacturing. A silica soot core preform is made, for example, using the OVD or VAD silica soot deposition process. However, the soot preform for making optical fiber can be manufactured also by other methods.

In certain aspects of the methods for making the co-doped optical fibers disclosed herein, high soot surface area preforms (i.e., as compared to preform surface areas used in conventional optical fiber processing) can be employed for doping the core using $SiCl_4$. In some embodiments, the surface area of the soot preform is larger than 10 $m^2$/gm, larger than 20 $m^2$/gm, larger than 25 $m^2$/gm, or even larger than 50 $m^2$/gm. In certain other embodiments, the surface area of the soot preform can be larger than 90 $m^2$/gm. In the embodiments described herein the soot is silica soot. The surface area of the soot preform can be measured using Brunauer-Emmett-Teller (BET) surface area characterization techniques, as understood within the operative field of the disclosure. According to one embodiment the soot preform has a density is about 0.5 $g/cm^3$ (e.g. 0.4-0.6 $g/cm^3$) and it is prepared in a lathe by flame depositing silica soot onto a 10 mm diameter removable alumina rotating bait rod comprising a silica handle.

The core soot preform is then loaded into a consolidation or sintering furnace, and the co-doping of the preform with chlorine and fluorine (or bromine and fluorine, or bromine, chlorine and fluorine) is achieved using a process comprising four steps.

In the first step of making of an optical preform codoped with at least two halogens, a silica soot preform is treated with a dehydration agent (for example, chlorine, $SOCl_2$, $SiCl_4$, or CO) to remove the water and metal impurities. The dehydration step is performed by exposing the preform to a temperature of between 900° C. and 1300° C.

In the second step of co-doping of the silica soot preform with two halogens, the preform is exposed to chlorine dopant and/or bromine dopant precursor (e.g., $SiCl_4$, $SiBr_4$) at a temperature between 900° C. and 1350° C., wherein the partial pressure of the chlorine or bromine dopant precursor is greater than 0.5 atm. In some embodiments, the second step of the co-doping of the preform is performed under conditions wherein the chlorine dopant precursor is greater than 1 atm. In some other embodiments, the second step of the co-doping of the preform to is performed under conditions wherein the chlorine dopant or bromine dopant precursor is greater than 2 atm. In still other embodiments, the second step of the co-doping of the preform with at least two different halogens is performed under conditions wherein the chlorine or bromine dopant precursor is greater than 5 atm. In yet other embodiments, the second step of the co-doping of the preform is performed under conditions wherein the chlorine or bromine dopant precursor is greater than 10 atm.

In the third step of co-doping of the preform with at least two halogens, the preform is exposed to a fluorine dopant pre-cursor (e.g., $SiF_4$) at a temperature between 1275° C. and 1450° C., wherein the partial pressure of the fluorine dopant precursor is greater than 0.1 atm. In some embodiments, the preform is exposed to a fluorine dopant precursor at a temperature greater than 1300° C. In some other embodiments, the preform is exposed to a fluorine dopant precursor at a temperature greater than 1350° C. In some other embodiments, the third step of the co-doping of the preform is performed under conditions wherein the fluorine dopant precursor is greater than 0.2 atm. In still other embodiments, the third step of the co-doping of the preform is performed under conditions wherein the fluorine dopant precursor is greater than 0.5 atm. In yet other embodiments, the second step of the co-doping of the preform is performed under conditions wherein the chlorine dopant precursor is greater than 1 atm. In some other embodiments, the third step of the co-doping of the preform is performed under conditions wherein the fluorine dopant precursor is greater than 2 atm.

In the fourth step of making a co-doped preform comprising at least two halogens, the co-doped preform is exposed to a temperature above 1400° C. to completely sinter and clarify the co-doped preform to yield a seed-free clear glass co-doped preform. In some embodiments, the fourth step of making a co-doped preform comprising at least two halogens is performed in presence of the fluorine dopant precursor (e.g., SiF4).

According to some embodiments a method for making core cane comprising:
(i) exposing a silica soot preform to at least one of:
   chlorine dopant precursor, bromine dopant precursor, or a combination thereof at a temperature between 900° C. and 1350° C., wherein the partial pressure of the chlorine or bromine dopant precursor is greater than 0.5 atm, to form Cl and/or Br doped soot preform;
(ii) exposing the Cl and/or Br doped soot preform to a fluorine dopant precursor at a temperature between 1275° C. and 1450 C, wherein the partial pressure of the fluorine dopant precursor is greater than 0.1 atm, to form a co-doped preform that contains Cl and/or Br, as well as F;
(iii) exposing the co-doped preform to a temperature above 1400° C. to completely sinter the codoped preform and to form a sintered core preform.

In a mixture of gases, each gas has a partial pressure which is the hypothetical pressure of that gas if it alone occupied the entire volume of the original mixture at the same temperature. The total pressure of an ideal gas mixture is the sum of the partial pressures of the gases in the mixture. It is noted that the partial pressure of the gas is the product of the mole (or volume) fraction of a gas in the gas mixture and the total pressure.

According to some embodiments, the method for making core cane further includes the step of redrawing the sintered core preform, to form a core cane.

According to some embodiments of the method, the partial pressure of chlorine dopant or bromine dopant precursor is greater than 1 atm, greater than 2 atm, greater than 5 atm, or even greater than 10 atm, and for example less than 50 atm.

According to some embodiments of the method, the partial pressure of fluorine dopant precursor is greater than 0.5 atm, greater than 1 atm, or even greater than 2 atm, and for example less than 20 atm According to some embodiments the sintered core preform includes Cl, Br or a combination thereof and further comprises fluorine, and
(a) difference between maximum and minimum concentration of chlorine or bromine in the sintered core preform is at least 0.4 wt %,
(b) difference between maximum and minimum concentration of fluorine in the sintered core preform is at least 0.45 wt %,
(c) maximum amount of chlorine in the sintered core preform is at least 0.7 wt %, and (d) maximum of fluorine in the sintered core preform is at least 0.75 wt.

According to some embodiments the core cane includes Cl, Br or a combination thereof and further comprises fluorine, and
(a) the difference between maximum and minimum concentration of chlorine or bromine in the core cane is at least 0.4 wt %,
(b) the difference between maximum and minimum concentration of fluorine in the core cane preform is at least 0.45 wt %,
(c) the maximum amount of chlorine in the in core cane is at least 0.7 wt %, and (d) the maximum of fluorine in the core cane is at least 0.75 wt.

According to some embodiments, as the core of the exemplary fibers embodiments in this disclosure contain both F and Cl dopants (e.g., fluorine, F, and chlorine, Cl), it can be advantageous for the concentrations of both the chlorine and fluorine to change as a function of radial distance from the center of the core to the outer radius of the core. For example, chlorine concentration can be highest at the center or adjacent to the center of the core and decrease as a function of radial distance to the outer radius of the core, while fluorine concentration can be highest at the edge of the core (e.g., at the outer radius of the core) and lowest at or adjacent the center of the core. It can also be advantageous for chlorine dopant to be introduced into the core in a non-uniform, graded like index profile, and for fluorine to be introduced into the core also in non-uniform profile. In particular, the chlorine concentration can be highest in the center of the core, lower at the outer radius of the core, with a doping profile approximately inverse to that of the graded profile achieved by the fluorine dopant. Thus, the concentration of the fluorine dopant at the center of the core may be relatively low, but increasing toward the outer radius of the core to form a graded index profile. These various co-doped graded index profiles can be created during the sinter phase of the core or during the drying phase of a soot-deposited core in a down-drive furnace, or with MCVD or PCVD processing techniques. $Cl_2$ or $SiCl_4$ can be used as the source precursor for chlorine dopants. Br gas, Bra, or $SiBr_4$ can be used as the source precursor for chlorine dopants. $SiF_4$ can be used as the source precursor for fluorine dopants.

According to some embodiments the maximum amount (peak amount) of chlorine in the fiber core is at least 1 wt %, for example at least 2 wt %, at least 3 wt %, e.g., 1 wt % to 4 wt %. According to some embodiments the maximum amount (peak amount) of fluorine in the fiber core is at least 1 wt %, for example at least 2 wt %, at least 3 wt %, e.g., 1 wt % to 4 wt %.

According to these embodiments the maximum amount of chlorine within the core is situated within the inner third of the core (i.e., within ⅓ of the outer radius of the core. According to some embodiments the maximum amount of chlorine within the core is situated within the inner quarter of the core. According to some embodiments the minimum amount of fluorine present within the core is situated within the inner third of the core (i.e., within ⅓ of the outer radius of the core. According to some embodiments the minimum amount of fluorine present within the core is situated within the inner quarter of the core.

According to some embodiments the minimum amount of chlorine present within the core is situated within the outer quarter of the core. According to some embodiments the minimum amount of chlorine present within the core is situated within the outer edge of the core. According to some embodiments, the difference between maximum and minimum concentration of chlorine within the core is at least 1 wt %, for example at least 2 wt %, or even at least 3 wt %. In some embodiments the difference between maximum and minimum concentration of chlorine within the core is 1 wt % to 4 wt %. For example, in some embodiments the ratio of maximum and minimum concentration of chlorine in the core is at least 5, at least 7, or even at least 10. In some embodiments the ratio of maximum and minimum concentration of chlorine in the core is between 10 and 1000 (e.g., between 10 and 100).

According to some embodiments the maximum amount of fluorine present within the core is situated within the outer quarter of the core. According to some embodiments the maximum amount of fluorine present within the core is situated within the outer edge of the core. According to some embodiments, the difference between maximum and minimum concentration of fluorine within the core is at least 1 wt %, for example at least 2 wt %, at least 3 wt %. In some embodiments the difference between maximum and minimum concentration of fluorine within the core is 1 wt % to 4 wt %. In some embodiments the ratio of maximum and minimum concentration of fluorine in the core is at least 5, at least 7, or even at least 10. In some embodiments the ratio of maximum and minimum concentration of chlorine in the core is between 5 and 1000 (e.g., 7.5 to 100).

According to certain aspects of the disclosure, the concentration of Cl within the core decreases radially from greater than 0.7 wt % to less than 0.25 wt % (as the radius increases). According to some embodiments the concentration of Cl within the core decreases radially from greater than 0.7 wt % to less than 0.15 wt %. For example according to some embodiments the concentration of Cl within the core decreases radially from greater than 0.7 wt % (at a location within the inner ⅓ of the core radius) to less than 0.05 wt % at the edge of the core.

The composition of the cladding can also be important in achieving the desired low attenuation properties, and the cladding may be doped with fluorine to lower the refractive index to be lower than the refractive index of the core. In certain aspects of the co-doped fibers, the relative refractive index of a depressed region within the cladding (e.g., achieved through fluorine doping) can be at least 0.25% less than the maximum relative refractive index of the core.

Similarly, in some embodiments, the relative refractive index difference between the core and the outer cladding region can be between 0.2% and 0.5%. Optionally, the cladding may be further doped with one or more of boron trioxide and chlorine.

Optionally, chlorine and/or $B_2O_3$ can be employed as dopants in the cladding alone, or as additions to a fluorine dopant already present in the cladding.

In some embodiments of the optical fiber designs in this disclosure, the core and cladding can be configured to minimize or eliminate the presence of other alkali elements (e.g., potassium). Comparatively, alkali doping is more expensive than doping processes used for other dopants (e.g., fluorine doping). Accordingly, the co-doped, alkali-free optical fiber designs disclosed herein are particularly optimized to reduce processing and manufacturing costs.

Figure 1A:
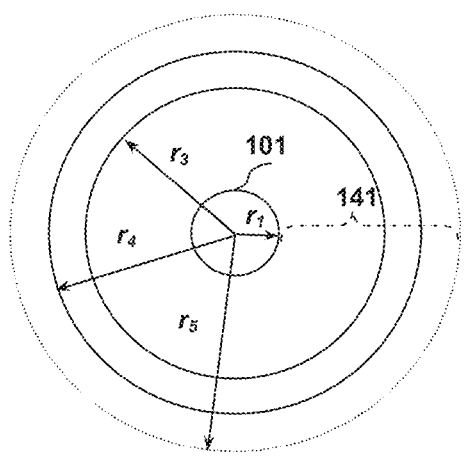
FIG. 1A is a cross-sectional view of the optical fiber depicted in FIG. 1.

FIG. 1 depicts the relative refractive index profile as a function of fiber radius for an exemplary embodiment of halogen co-doped optical fibers 310 and, respectively, according to aspects of this disclosure. This relative refractive index profile is plotted relative to the outer cladding region (i.e., relative to the refractive index delta 44%). The exemplary optical fiber 310 is single mode (SM) at 1550 nm. A cross-section of fiber 310 is also shown in FIG. 1A, for further illustration of the salient features of these fibers.

As shown in FIG. 1, optical fiber 310 possesses a core 101. The core 101 can have an alpha profile with a value from about 1.5 to about 5 to form a graded relative refractive index profile 1. Preferably, core 101 exhibits an alpha profile with a value of less than 3, for example 1.5 to 3, or 1.8 to 2.5, and more preferably 1.9 to 2.3. The relative refractive index $\Delta_1$ of the core 101 varies as a function of fiber radius (r), and has a maximum relative refractive index $\Delta_{1MAX}$. The core 101 has a core radius 100 (also refereed as $r_1$ herein). According to some embodiments, the core 101, from its center to its radius 100 ($r_1$) primarily contains $SiO_2$ doped with F and Cl. According to other embodiments, the core 101, from its center to its radius 100 ($r_1$), primarily contains $SiO_2$ doped with F and Br. Optionally, the core 101 may be additionally doped with $K_2O$, and/or $P_2O_5$. These dopants may be introduced into the $SiO_2$ core 101 by OVD, VAD, MCVD, and PCVD processing methods. In some embodiments, the core is free of Germania and comprised of at least two halogen dopants. In some embodiments, the co-doped halogens in the core are fluorine and chlorine. In some other embodiments, the co-doped halogens in the cores are chlorine and bromine. In still other embodiments, the co-doped halogens in the core are bromine and fluorine.

Co-doped fibers 310 have a cladding 141 (FIGS. 1 and 1A), that includes either two cladding regions or three cladding regions. All of the cladding regions may primarily contain $SiO_2$ doped with F. Optionally, Cl and/or $B_2O_3$ can be employed as dopants in the various cladding regions in addition to the F dopant.

Referring again to FIGS. 1 and 1A, co-doped optical fiber 310 possesses a cladding 141 with a thickness 200. The cladding 141 comprises at least two cladding regions, a depressed cladding region with a relative refractive index profile 3 (which comprises $\Delta_{3\ min}$, and is referred as a moat herein) and has and an outer radius 110 ($r_3$), and outer cladding region with a relative refractive index profile 4 and an outer radius ($r_4$). The outer radius r4 is shown in FIG. 1 as 120 (if the optional outer most region is not present, or 150 if the optional outermost cladding region is present).

In some embodiments cladding 141 includes an additional (optional) region with a relative refractive index profile 2 (not shown in FIG. 1) situated between the depressed index cladding region relative refractive index profile 3 and the core. In these embodiments this additional optional cladding region has an outer radius $r_2 < r_3$. In some embodiments relative refractive index 4 ($\Delta_4$) of the cladding 141 is preferably substantially constant out to the outer radius 120, 150 ($r_4$). In some embodiments the relative refractive index 4 of the cladding 141 has a step-shaped profile.

In some embodiments cladding 141 comprises an optional outermost cladding region with (a stress relieving region), with a relative refractive index profile 5, and a maximum refractive index $\Delta_5$. This region is depicted, for example, in FIG. 1 (dashed lines). In these embodiments the outmost cladding region surrounds the outer cladding region and is in contact with the outer cladding region (with the outermost cladding region being, for example pure $SiO_2$).

Each of these cladding regions surrounds the core 101. As depicted in FIG. 1, the depressed cladding region has a relative refractive index profile 3 with a lower refractive index delta than the relative refractive index profile 4 of the outer cladding region. Together, these cladding regions possess a total thickness 200, corresponding to the thickness of the cladding 141. The relative refractive index profiles 3 and 4 in cladding 141 each may possess a step-shaped profile.

As also shown in FIG. 1, the relative refractive index profile of the depressed cladding region 3 in co-doped fiber 310 may have a value approximately equal to $\Delta_{3\ min}$. In FIG. 1, the relative refractive index profile 3 of the depressed cladding region exhibits a moat of width $m_1$ such that its relative refractive index (43) is lower than the relative refractive index of the core 101 and the relative refractive index (44) of the next outer cladding region, which corresponds to the relative refractive index profile 4. As shown in FIG. 1, the depressed cladding region with a relative refractive index profile 3 extends to a radius 110 (also referred to as $r_3$ herein). It is noted that Br, and/or F and/or Cl, or combinations thereof, may be included as refractive index altering dopants in the depressed cladding region to facilitate the creation of the moat of width $m_1$ with respect to outer cladding region, corresponding to the relative refractive index profile 4. The relative refractive index 4 ($\Delta_4$) of the outer cladding is preferably substantially constant out to its outer radius ($r_4$) 150, 120.

When configured for single mode operation, co-doped optical fibers 310 can have an alpha of less than 5, e.g., between about 1.5 and 4.5. The alpha value may also be set within a range of about 1.7 to about 3. Further, the core 101 of fibers 310 may have a peak relative refractive index delta $\Delta_{1max}$ of about 0.2% A to about +0.65%, (e.g., 0.3 to 0.5%) relative to the outer cladding region. The peak (maximum) relative refractive index delta of the core, $\Delta_{1max}$, may also range from about from about +0.25% to 0.45% (relative to the outer cladding). In addition, the core 101 of fibers 310 is configured for single mode operation, and can have a core radius 100 ($r_1$) of about 4 to 12 microns. The effective area, $A_{eff}$, of core 101 can range from about 60 $\mu m^2$ to about 150 $\mu m^2$.

The co-doped optical fibers 310 configured for single mode operation include relatively low cost fluorine and chlorine dopants compared to other dopant options, including germania. Yet these co-doped optical fiber designs possess un-characteristically low attenuation, less than about 0.17 dB/km at a wavelength 1550 nm. In certain aspects, the co-doped optical fibers can exhibit very low attenuation levels of less than about 0.16 dB/km, and even less than about 0.15 dB/km. Fibers 310 are configured for single mode operation at 1550 nm and are particularly suited for G.652 and G.654 optical fiber applications. Such co-doped fibers 310 may, for example, exhibit a cable cutoff less than 1530 nm, more preferably less than 1500 nm, and even more preferably less than 1260 nm, and a zero dispersion wavelength between 1300 and 1324 nm. For G.652 or G.657 applications the fibers may be configured to have dispersion at 1550 nm which is less than or equal to about 22 ps/nm/km.

Low-attenuation co-doped optical fibers 310 that are doped with fluorine and chlorine may still be prone to "stress-optic" effects. In particular, these fibers can be prone to high internal stresses associated with their production that can degrade optical performance, despite the use of a graded index core. In particular, the internal stresses generated during the production of these fibers can influence their refractive index profiles in a way that compromises their optical transmission properties. The optional outer most cladding region reduces the internal stresses and improves attenuation performance of the optical fibers.

The co-doped optical fibers described herein may be fabricated with drawing processes having a draw tension of about less than 90 g. Preferably, the draw tension is set at less than about 45 g, and more preferably, set between about 30 g and about 45 g. Fibers that are formed with these processing parameters, are even less susceptible to draw-induced stresses that can be detrimental to the optical transmission properties of the fiber, including waveguide propagation performance. Co-doped optical fibers, when processed and configured according to the foregoing, are estimated to possess an attenuation of less than about 0.17 dB/km, less than about 0.16 dB/km, and even less than about 0.15 dB/km, at operating wavelengths of 1550 nm.

In certain embodiments of the fibers 310 the stiff outer most cladding region (i.e., a stress relieving layer) in the cladding 141 (i.e., between $r_5$ and $r_4$), shown for example in FIG. 1 as the outermost cladding region with relative refractive index profile 5, has a pure silica glass composition. In other aspects, the stiff outermost cladding region has a silicon oxynitride glass composition. According to certain implementations, the stiff outermost cladding region of the cladding 141 has a composition with less F (e.g., less moles of F) than the combined total amount of Cl and F (e.g., total moles of Cl and F) within the composition of the core 101. The stiff outermost cladding region of the cladding 141 can also have less moles of Cl and F than the combined total moles of Cl and F in the core 101. In an additional embodiment, the stiff outer cladding portion has less moles of Cl than the combined total moles of Cl and F in the core 101. In some embodiments the relative refractive index of the outermost cladding region is greater than that of the core 101.

The co-doped optical fibers 310 configured for single mode operation can also have low bend loss. As used herein, "bend loss" refers to a macrobend loss value for the optical fibers, as measured at 1550 nm in units of dB/turn. In some embodiments, optical fiber designs configured as fiber 300 can have a macrobend loss of ≤5 dB/turn on a 15 mm diameter mandrel. According to certain embodiments, the macrobend loss for the fibers is ≤2 dB/turn on a 15 mm diameter mandrel, ≤1.5 dB/turn on a 20 mm diameter mandrel, ≤0.5 dB/turn on a 20 mm diameter mandrel, ≤0.025 dB/turn on a 30 mm diameter mandrel, and ≤0.01 dB/turn on a 30 mm diameter mandrel. In some embodiments, the optical fiber designs configured as fibers 310 can have exhibit a macrobend loss of ≤1.5 dB/turn on a 10 mm diameter mandrel, ≤1 dB/turn on a 10 mm diameter mandrel, ≤1.5 dB/turn on a 15 mm diameter mandrel, ≤1 dB/turn on a 15 mm diameter mandrel, ≤0.5 dB/turn on a 15 mm diameter mandrel, ≤0.5 dB/turn on a 20 mm diameter mandrel, ≤0.2 dB/turn on a 20 mm diameter mandrel, ≤0.1 dB/turn on a 20 mm diameter mandrel, ≤0.025 dB/turn on a 30 mm diameter mandrel, and ≤0.01 dB/turn on a 30 mm diameter mandrel.

The fibers disclosed herein, including fibers 310, may be drawn from optical fiber preforms made using conventional manufacturing techniques and using known fiber draw methods and apparatus, for example as are disclosed in U.S. Pat. Nos. 7,565,820, 5,410,567, 7,832,675, and 6,027,062, the specifications of which are hereby incorporated by reference. In particular, co-doped optical fibers 310 600 can be pulled from a root portion of the optical fiber preform by a tractor within a draw furnace. After leaving the draw furnace, the bare optical fiber encounters a diameter monitor (D) which provides a signal that is used in a feedback control loop to regulate the speed of the tractor to maintain a constant fiber diameter. The bare optical fiber then passes through a fiber tension measurement device (T) that measures the tension of the optical fiber caused by pulling the fiber from the preform. This tension can increase depending on the speed of the fiber draw, the temperature and viscosity of the root of the preform, etc. One example of a fiber tension measurement device is disclosed in European Patent No. EP 0479120 A2, which is incorporated herein by reference. The optical fibers disclosed herein, including fibers 300, 310, 320 and 600 can be drawn from such preforms and coated with standard primary and secondary urethane acrylate coatings.

Although the co-doped cores 101 of the fibers 310 disclosed herein may optionally contain some level of alkali, the embodiments disclosed herein may employ cores which are substantially free of alkali, and in many embodiments the cores preferably contain no alkali.

Referring again to FIG. 1, each of the co-doped cores of the optical fibers 310 can be configured to exhibit an attenuation of less than about 0.17 dB/km at a wavelength of 1550 nm. These co-doped fibers (i.e., fibers with co-doped core) include a core 101 in the fiber that comprises silica co-doped with fluorine and chlorine. The fibers also include a cladding 141 in the fiber that surrounds the core 101. Further, the core 101 has an effective refractive index at least 0.25% compared to that of the outer cladding region. In some embodiments, the core 101 has an effective refractive index at least +0.35% compared to outer cladding. In other embodiments, the core 101 has an effective refractive index at least 0.4% compared to pure silica. In addition, the cladding 141 can include a depressed region (also referred herein as a moat) having a relative refractive index that is substantially constant and lower than the relative refractive index profile 1 of the core 101. For example, the relative refractive index profile 3 of the co-doped fiber 310 depicted in FIG. 1 corresponds to such a depressed region.

The fibers 310 with the least two halogens codoped core shown in FIG. 1 can be configured to exhibit an attenuation of less than about 0.17 dB/km at a wavelength of 1550 nm. These co-doped fibers include a core 101 in the fiber that comprises silica co-doped with fluorine and chlorine. The fibers also include a cladding 141 in the fiber that surrounds the core 101. Further, the core 101 as depicted in FIG. 1 has a graded refractive index profile having an alpha of less than 5, e.g., 1.5 to 5. In addition, as discussed above, the cladding 141 includes a depressed index region (also referred herein as depressed region, depressed cladding region, or moat) having a relative refractive index that is substantially constant and lower than a relative refractive index of the of the outer cladding region (with the outer cladding region having the relative refractive index profile $\Delta_4$ depicted in FIG. 1). The co-doped fibers 310 disclosed herein, along with other co-doped optical fibers consistent with these embodiments, utilize peak (maximum) chlorine concentrations at about 0.7 wt % or higher (e.g., 1 wt % or higher), which reflect chlorine concentration levels significantly higher than the chlorine levels utilized in some conventional optical fibers. The cladding 141 may include an optional outermost cladding region surrounding the moat and the outer cladding region, wherein the outermost cladding region has viscosity lower than the viscosity of the outer cladding region. In some embodiments, the viscosity of the outermost cladding region is at least 1.5 times higher than viscosity of the outer cladding region at 1650° C. In other embodiments, the viscosity of the outermost cladding region is at least 2 times higher than viscosity of the outer cladding region at 1650° C. In still other embodiments, the viscosity of the outermost cladding region is between 1.5 and 10 times higher than viscosity of the outer cladding region at 1650° C.

Figure 2:
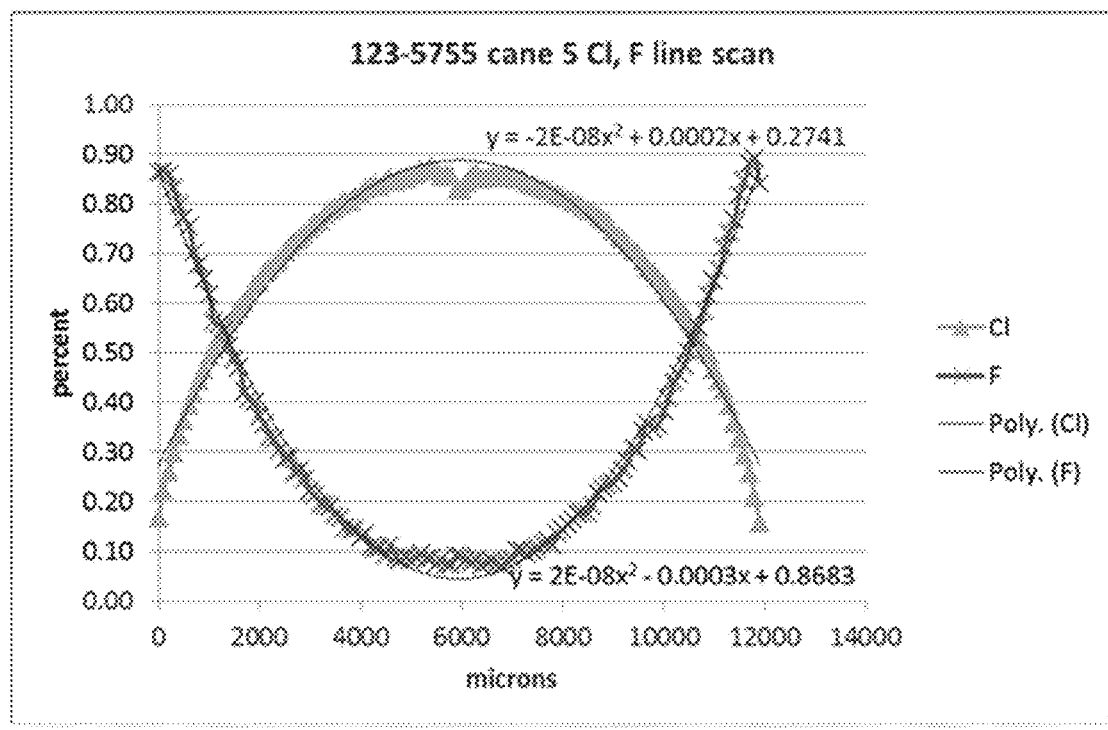
FIG. 2 is a plot of dopant concentration as a function of radial distance within a core cane suitable for drawing into co-doped optical fibers.

Referring to FIG. 2, a plot is provided of measured dopant concentration (wt. %) as a function of radial distance (μm) within a co-doped core cane suitable for drawing into a core (e.g., core 101) of the co-doped optical fibers (e.g., fibers 310) according to aspects of this disclosure. The core cane was processed and doped according to similar conditions described herein.

As shown in FIG. 2, dopant concentration levels of wt. % Cl and F are depicted from the center of the core cane to an outer radius of about 7000 μm. In this embodiment the Cl concentration level varies from about 0.9 wt. % (near the center of the core) to about 0.15 wt. % (near the edge), and the F concentration level varies from about 0.9% (maximum concentration, near the edge) to about 0.1 wt % (near or at the center). It is also apparent that these concentration levels as a function of core cane radial distance are indicative of a graded alpha profile, with an alpha being between 1.5 and 5. At these core cane doping concentrations, it is expected that a relative refractive index difference (delta difference) of 0.35% between the core and the outer cladding would be preferred for effective waveguide behavior suitable for single mode operation of the fiber. In this particular experiment, the core soot preform was doped in an environment comprising 83% $SiCl_4$/17% He mixture at a temperature of 1175° C. for 90 minutes, followed by exposure to a gas mixture of 9% SiF4/91% He at 1325° C. for 15 minutes. The soot preform was subsequently sintered to void-free glass preform by increasing the temperature to above 1450° C.

Figure 3:
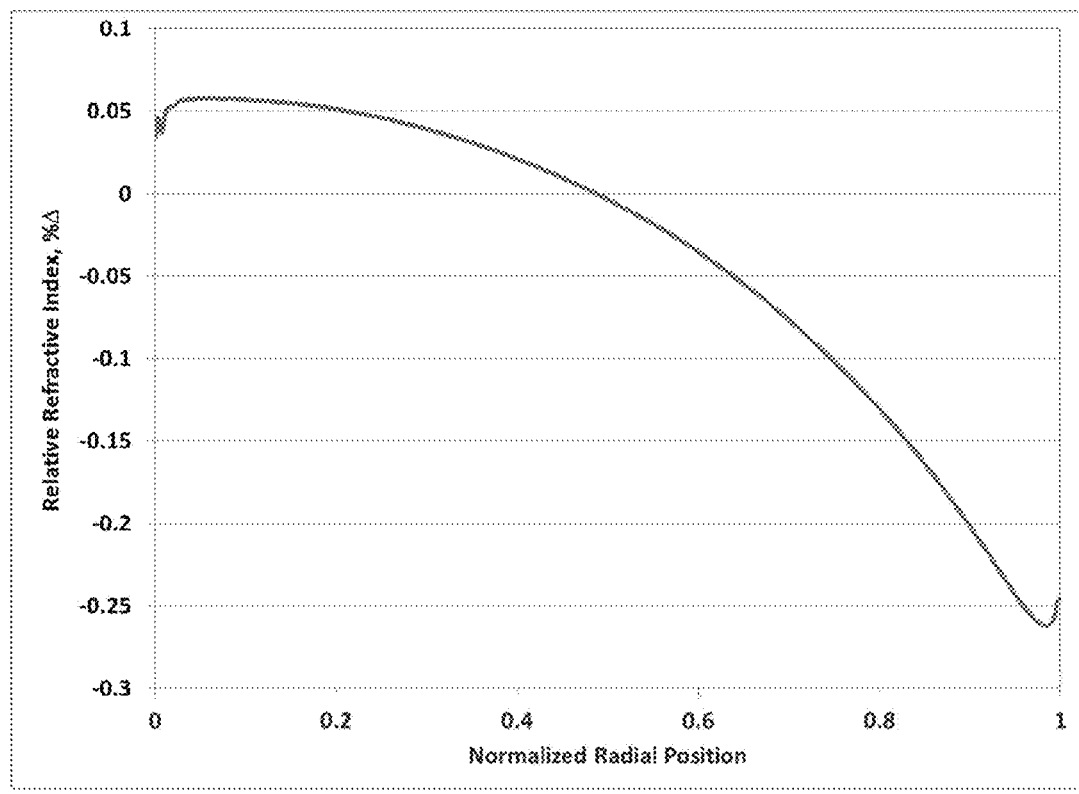
FIG. 3 is a plot that depicts refractive index delta of the fiber core as a function of fiber radius, for an optical drawn from a fiber cane associated with FIG. 2.

FIG. 3 illustrates measured relative refractive index profile of the fiber core made from the core cane of FIG. 2. As shown, the co-doped core has a combined core alpha of less than 5 (and in some embodiments, the core alpha is less than 3). According to some embodiments, the difference between the maximum relative refractive index and the minimum relative refractive index in the core is between 0.25% and 0.55%. For example, FIG. 3 illustrates relative refractive index of the fiber from the core cane corresponding to FIG. 2. More specifically, FIG. 3 illustrates that in this embodiment fiber core has a graded index profile with a difference in relative gradient index (max-min) of about 0.3%.

EXAMPLES

Various embodiments of the foregoing fibers will be further clarified by the following examples of modeled fibers. It will be apparent to those skilled in the art that various modifications and variations can be made without departing from the spirit or scope of the present disclosure.

All of the examples listed below have an outer cladding radius of 62.5 microns, and a fiber cladding diameter of 125 microns. Further, all optical parameters provided for the fibers modeled below are at 1550 nm and the LP01 mode, unless otherwise stated.

Examples of modeled silica based halogen (e.g., chlorine and fluorine, or bromine and fluorine) co-doped core, fluorine-doped clad, single-moded (SM) optical fibers and properties are shown below in Tables 1A-2B, consistent with one or more of the co-doped fibers 310 described in the foregoing aspects of the disclosure. More specifically, set forth in Tables 1A-2B below are the following parameters and fiber dimensions for various co-doped SM fibers: $\Delta_{1max}$ (%) of the core, core alpha, halogen core dopants concentrations (e.g., Cl and F, or Br and F) (wt. %), radius 100 ($r_1$) of the core, the outer radius of the moat 110 ($r_3$, μm), the cladding outer radius 120 ($r_4$, μm), moat delta $\Delta_3$ (%), outer cladding delta $\Delta_4$ (%), 22 meter cable cutoff wavelength (nm), mode field diameter, MFD (μm) at 1310 nm, effective area, Aeff at 1310 nm (μm$^2$), dispersion (ps/nm/km) and dispersion slope (ps/nm$^2$/km) at 1310 nm, zero dispersion wavelength, Lambda zero (nm), mode field diameter, MFD (μm) at 1550 nm, effective area, Aeff at 1550 nm (μm$^2$), dispersion (ps/nm/km) and dispersion slope (ps/nm$^2$/km) at 1550 nm, attenuation at 1310 and 1550 nm (dB/km). Also included in Tables 1A-2B are bend loss values at 1550 nm in dB/turn for 20 mm diameter mandrels. The moat volume $V_3$ of the exemplary embodiments are between 30% micron$^2$ and 70% micron$^2$.

Finally, the designation "N/A" indicates that the parameter is not applicable to the particular fiber example.

Table 1A, below, lists the properties of SM optical fibers having Cl and F co-doped cores (e.g., co-doped fiber 310 in FIG. 1).

TABLE 1A

| Parameter | Ex. 1 | Ex. 2 |
|---|---|---|
| Core delta $\Delta 1_{max}$ (%) | 0.396 | 0.4 |
| Core Alpha | 2.2 | 2.2 |
| Core radius $r_1$ (μm) | 5.35 | 5.26 |
| Moat outer radius $r_3$ | 13.4 | 13.20 |
| $r_1/r_3$ | 0.40 | 0.40 |
| Cladding outer radius $r_4$ (μm) | 62.5 | 62.5 |
| Max Core dopant Cl (wt. %) | 1.08 | 1.1 |
| Min Core dopant Cl (wt. %) Cl (wt. %) | 0.18 | 0.18 |
| Max Core dopant F (wt. %) | 1.08 | 1.1 |
| Min Core dopant F (wt. %) | 0.12 | 0.12 |
| Moat delta (%), $\Delta_{3MIN}$, relative to $\Delta_4$ | −0.007 | −0.004 |
| F wt % in the moat | 1.08 | 1.1 |
| V3 (% micron$^2$) | 5.0 | 2.9 |
| Outer cladding delta $\Delta_4$ % | 0. | 0. |
| Dopant F in outer cladding (wt %) | 1.05 | 1.07 |
| 22 meter cable cutoff (nm) | 1200 | 1200 |
| MFD at 1310 nm (μm) | 9.2 | 9.2 |
| Aeff at 1310 nm (μm$^2$) | 66 | 66 |
| Dispersion at 1310 nm (ps/nm/km) | 0.089 | 0.089 |
| Dispersion slope at 1310 nm (ps/nm$^2$/km) | 0.089 | 0.089 |
| Lambda zero (nm) | 1316 | 1318 |
| Attenuation at 1310 nm (dB/km) | 0.3 | 0.3 |
| MFD at 1550 nm (μm) | 10.48 | 10.48 |
| Aeff at 1550 nm (μm$^2$) | 86 | 86 |
| Dispersion at 1550 nm (ps/nm/km) | 17.7 | 18.2 |
| Slope at 1550 nm (ps/nm$^2$/km) | 0.06 | 0.06 |
| MAC # (1310 nm MFD/Cable Cutoff) | 7.67 | 7.67 |
| Attenuation at 1550 nm (dB/km) | <0.17 | <0.17 |
| 20 mm diameter bend loss (dB/turn) | 0.40 | 0.60 |

Table 1B, below illustrates parameters of the optical fibers that are similar to the fibers of Table 1A, but the halogens of the Table B fibers are Br and F.

TABLE 1B

| Parameter | Ex. 3 | Ex. 4 |
|---|---|---|
| Core delta $\Delta_1$max (%) | 0.396 | 0.4 |
| Core Alpha | 2.2 | 2.2 |
| Core radius $r_1$ (μm) | 5.35 | 5.26 |
| Radius $r_3$ | 13.4 | 13.20 |
| $r_1/r_3$ | 0.40 | 0.40 |
| Cladding's outer radius $r_4$ (μm) | 62.5 | 62.5 |
| Max Core dopant Br (wt. %) | 0.7 | 0.71 |
| Min Core dopant Br (wt. %) Cl (wt. %) | 0.12 | 0.12 |
| Max Core dopant F (wt. %) | 1.08 | 1.1 |
| Min Core dopant F (wt. %) | 0.12 | 0.12 |
| Moat delta (%), $\Delta_{3MIN}$, relative to $\Delta_4$ % | −0.007 | −0.004 |
| Dopant F wt % in the moat | 1.08 | 1.1 |
| $V_3$ (% micron$^2$) | 5.0 | 2.9 |
| Outer cladding delta $\Delta_4$ (%) | 0. | 0. |
| Dopant F in outer cladding (wt %) | 1.05 | 1.07 |
| 22 meter cable cutoff (nm) | 1200 | 1200 |
| MFD at 1310 nm (μm) | 9.2 | 9.2 |
| Aeff at 1310 nm (μm$^2$) | 66 | 66 |
| Dispersion at 1310 nm (ps/nm/km) | 0.089 | 0.089 |
| Dispersion slope at 1310 nm (ps/nm/km) | 0.089 | 0.089 |
| Lambda zero (nm) | 1316 | 1318 |
| Attenuation at 1310 nm (dB/km) | 0.3 | 0.3 |
| MFD at 1550 nm (μm) | 10.48 | 10.48 |
| Aeff at 1550 nm (μm2) | 86 | 86 |
| Dispersion at 1550 nm (ps/nm/km) | 17.7 | 18.2 |
| Slope at 1550 nm (ps/nm$^2$/km) | 0.06 | 0.06 |
| MAC # (1310 nm MFD/Cable Cutoff) | 7.67 | 7.67 |
| Attenuation at 1550 nm (dB/km) | <0.17 | <0.17 |
| 20 mm diameter bend loss (dB/turn) | 0.40 | 0.60 |

Table 2A, below, lists the properties of SM optical fibers having Cl and F co-doped cores.

TABLE 2A

| Parameter | Example 5 | Example 6 | Example 7 | Example 8 |
|---|---|---|---|---|
| Core delta, $\Delta 1$max (%) | 0.33 | 0.33 | 0.31 | 0.3 |
| Core radius, $r_1$ (micron) | 6.91 | 6.6 | 6.6 | 6.7 |
| Core Alpha | 2 | 2 | 2 | 2 |
| Max Core dopant Cl (wt. %) | 0.9 | 0.9 | 0.85 | 0.82 |
| Min Core dopant Cl (wt. %) | 0.15 | 0.15 | 0.14 | 0.14 |
| Max Core dopant F (wt. %) | 0.9 | 0.9 | 0.85 | 0.82 |
| Min Core dopant F (wt. %) | 0.1 | 0.1 | 0.09 | 0.09 |
| Radius $r_3$ (micron) | 21 | 21.6 | 19 | 19 |
| $r_1/r_3$ | 0.33 | 0.3 | 0.35 | 0.35 |
| Moat delta, $\Delta_3$ (%) | −0.15 | −0.13 | −0.18 | −0.2 |
| F weight % in the moat | 0.9 | 0.9 | 0.9 | 0.9 |
| Outer cladding region, $\Delta_4$ (%) | 0 | 0 | 0 | 0 |
| F weight % in outer cladding | 0.42 | 0.48 | 0.32 | 0.25 |
| Outer cladding radius, Rmax (microns) | 62.5 | 62.5 | 62.5 | 62.5 |
| Moat volume, $V_3$ (% micron$^2$) | 59.4 | 55.16 | 57.14 | 63.22 |
| Zero dispersion wavelength (nm) | 1303 | 1308.3 | 1304.9 | 1303 |
| Dispersion at 1310 nm (ps/nm/km) | 1.37 | 0.881 | 1.19 | 1.36 |

TABLE 2A-continued

| Parameter | Example 5 | Example 6 | Example 7 | Example 8 |
|---|---|---|---|---|
| Dispersion Slope at 1310 nm (ps/nm$^2$/km) | 0.0913 | 0.0904 | 0.0906 | 0.091 |
| Dispersion 1550 nm (ps/nm/km) | 19.17 | 18.63 | 18.83 | 19.04 |
| Dispersion Slope 1550 nm (ps/nm$^2$/km) | 0.062 | 0.061 | 0.061 | 0.061 |

Table 2A illustrates properties of SM other optical fibers comprising Cl and F co-doped cores, a moat or depressed index region, and an outer cladding region. These fiber have optical performances compatible with G.652 recommendations, bend loss at 15 mm mandrel diameter of less than 0.5 dB/turn and zero dispersion wavelength between 1300 nm and 1324 nm. The relative refractive index profile shown in FIG. 1, and disclosed in Tables 1A-2B is relative to the minimum refractive index of the outer cladding region.

Table 2B, below, lists the properties of SM optical fibers having Br and F co-doped cores (e.g., co-doped fiber 310 in FIG. 1).

TABLE 2B

| Parameter | Example 9 | Example 10 | Example 11 | Example 12 |
|---|---|---|---|---|
| Core index delta, $\Delta_{1max}$ (%) | 0.33 | 0.33 | 0.31 | 0.3 |
| Core radius, r1 (micron) | 6.91 | 6.6 | 6.6 | 6.7 |
| Core Alpha | 2 | 2 | 2 | 2 |
| Max Core dopant Br (wt. %) | 0.58 | 0.58 | 0.55 | 0.53 |
| Min Core dopant Br (wt. %) | 0.1 | 0.1 | 0.09 | 0.09 |
| Max Core dopant F (wt. %) | 0.9 | 0.9 | 0.85 | 0.82 |
| Min Core dopant F (wt. %) | 0.1 | 0.1 | 0.09 | 0.09 |
| Radius, r$_3$ (micron) | 21 | 21.6 | 19 | 19 |
| r$_1$/r$_3$ | 0.33 | 0.3 | 0.35 | 0.35 |
| Moat delta $\Delta$3 (%) | −0.15 | −0.13 | −0.18 | −0.2 |
| F wt % in the moat | 0.9 | 0.9 | 0.9 | 0.9 |
| outer cladding delta, $\Delta$4 (%) | 0 | 0 | 0 | 0 |
| F (wt %) in outer cladding | 0.42 | 0.48 | 0.32 | 0.25 |
| Outer fiber radius (clad outer radius), Rmax (microns) | 62.5 | 62.5 | 62.5 | 62.5 |
| Moat volume, V3 (% micron$^2$) | 59.4 | 55.16 | 57.14 | 63.22 |
| Zero dispersion wavelength (nm) | 1303 | 1308.3 | 1304.9 | 1303 |
| Dispersion at 1310 nm (ps/nm/km) | 1.37 | 0.881 | 1.19 | 1.36 |
| Dispersion Slope at 1310 nm (ps/nm$^2$/km) | 0.0913 | 0.0904 | 0.0906 | 0.091 |
| Dispersion 1550 nm (ps/nm/km) | 19.17 | 18.63 | 18.83 | 19.04 |
| Dispersion Slope 1550 nm (ps/nm$^2$/km) | 0.062 | 0.061 | 0.061 | 0.061 |

The optical properties of the single-moded (SM) optical fibers in Tables 1-3 demonstrate low attenuation, excellent bend performance and other properties compatible with G.657, G.652 and G.654 specifications. The optical properties of the single mode fibers described herein demonstrate low attenuation, and an excellent bend performance.

Examples of manufacturing and processing conditions, and properties, for chlorine and fluorine co-doped core canes are detailed below. These core canes are suitable for drawing co-doped optical fibers consistent with aspects of the disclosure including but not limited to co-doped optical fibers 310.

It is to be understood that the foregoing is exemplary only and is intended to provide an overview for the understanding of the nature and character of the fibers which are defined by the claims. The accompanying drawings are included to provide a further understanding of the preferred embodiments and are incorporated and constitute part of the specification. The drawings illustrate various features and embodiments which, together with their description, serve to explain the principals and operation. It will be apparent to those skilled in the art that various modifications and variations can be made to the preferred embodiments as described herein without departing from the spirit or scope of the claims.

What is claimed is:

1. A single mode optical fiber, comprising:
   a core having a graded refractive index profile with an alpha of less than 5; and
   the cladding comprising a depressed cladding region and an outer cladding region in contact with and surrounding the depressed cladding region, wherein the core has a relative refractive index of greater than +0.25% compared to that of the outer cladding region, wherein the core comprises silica co-doped with a first halogen and a second halogen, wherein the concentrations of said first and said second halogen within the core are non-uniform, such that:
   (a) the ratio of maximum and minimum concentration of the first halogen in the core is at least 3,
   (b) the ratio of maximum and minimum concentration of the second halogen in the core is at least 3,
   (c) the concentration within the core of one halogen increases as distance from the center of the core increases,
   (d) and the concentration within the core of the other halogen decreases as distance from the center of the core increases, wherein a fiber has an attenuation of less than about 0.17 dB/km at a wavelength of 1550 nm.

2. The single mode optical fiber of claim 1, wherein the ratio of maximum and minimum concentration of the first halogen in the core is at least 10.

3. The single mode optical fiber of claim 2, the ratio of maximum and minimum concentration of the second halogen in the core is at least 10.

4. The single mode optical fiber of claim 1 wherein the first halogen is Cl or Br, and the second halogen is F.

5. A single mode optical fiber, comprising:
   a core having a graded refractive index profile with an alpha of less than 5; and
   a cladding surrounding the core, the cladding comprising a moat and comprising a moat and an outer cladding region;
   wherein the core has a relative refractive index of greater than +0.05% compared to pure silica, wherein the core comprises silica co-doped with chlorine and fluorine, wherein the concentrations of fluorine and chlorine within the core are non-uniform, such that:
   (a) difference between maximum and minimum concentration of chlorine in the core is at least 0.4 wt %,
   (b) difference between maximum and minimum concentration of fluorine in the core is at least 0.45 wt %,
   (c) the maximum amount of chlorine in the core is at least 0.7 wt %, and
   (d) the maximum of fluorine in the core is at least 0.75 wt %, wherein the fiber has an attenuation of less than about 0.17 dB/km at a wavelength of 1550 nm.

6. The fiber according to claim 5, wherein the cladding comprises a depressed region having a relative refractive index that is lower than a maximum relative refractive index of the core.

7. The fiber according to claim 5, wherein-the maximum amount of chlorine in the core is at least 1 wt %.

8. The fiber according to claim 5, wherein the maximum amount of fluorine in the core is at least 1 wt %.

9. The fiber according to claim 5, wherein the difference between maximum and minimum concentration of chlorine in the core is at least 1 wt %.

10. The fiber according to claim 5, wherein the difference between maximum and minimum concentration of fluorine in the core is at least 1 wt %.

11. The fiber according to claim 5 wherein the difference between maximum and minimum concentration of fluorine in the core is at least 2 wt %.

12. The fiber according to claim 5, wherein the ratio of maximum and minimum concentration of chlorine in the core is at least 3.

13. The fiber according to claim 5, wherein the ratio of maximum and minimum concentration of chlorine in the core is at least 10 and less than 1000.

14. The fiber according to claim 5, wherein the ratio of maximum and minimum concentration of fluorine in the core is at least 5.

15. The fiber according to claim 5, wherein the ratio of concentration of chlorine to fluorine at the center of the core is between 3 and 1000.

16. The fiber according to claim 5, wherein the relative refractive index difference between the relative maximum refractive index in the core and the outer cladding region is between 0.2% and 0.6%.

17. The fiber according to claim 1, wherein the relative refractive index difference between the maximum refractive index in the core and the outer cladding region is between 0.3% and 0.5%.

18. The fiber according to claim 1, wherein the fiber is further characterized by a 22 m cable cutoff wavelength of:
(i) less than 1530 nm; or
(ii) less than 1260 nm.

19. The fiber according to claim 1, wherein the fiber having an attenuation of less than about 0.17 dB/km at a wavelength of 1550 nm.

20. A method of making core cane comprising:
(i) exposing a silica soot preform to at least one of:
chlorine dopant precursor, bromine dopant precursor, or a combination thereof at a temperature between 900° C. and 1350° C., wherein the partial pressure of the chlorine or bromine dopant precursor is greater than 0.5 atm, to form Cl and/or Br doped soot preform;
(ii) exposing the Cl and/or Br doped soot preform to a fluorine dopant precursor at a temperature between 1275° C. and 1450 C, wherein the partial pressure of the fluorine dopant precursor is greater than 0.1 atm, to form a co-doped doped preform;
(iii) exposing the co-doped preform to a temperature above 1400° C. to completely sinter the codoped preform and to form a sintered core preform.

21. The method of claim 20, further redrawing the sintered core preform, to form a core cane.

22. The method of claim 20, wherein the partial pressure of chlorine dopant or bromine dopant precursor is greater than 1 atm.

23. The method of claim 20, wherein the partial pressure of chlorine dopant or bromine dopant precursor is greater than 5 atm.

24. The method of claim 20, wherein the partial pressure of fluorine dopant precursor is greater than 0.5 atm.

25. The method of claim 20, wherein the partial pressure of fluorine dopant precursor is greater than 2 atm.

26. The method of claim 20, wherein said sintered core preform included Cl, Br, or a combination thereof and further comprises fluorine, and
(a) difference between maximum and minimum concentration of chlorine or bromine in the sintered core preform is at least 0.4 wt %,
(b) difference between maximum and minimum concentration of fluorine in the sintered core preform is at least 0.45 wt %,
(c) a maximum amount of chlorine in the sintered core preform is at least 0.7 wt %, and
(d) a maximum of fluorine in the sintered core preform is at least 0.75 wt.

* * * * *

UNITED STATES PATENT AND TRADEMARK OFFICE
CERTIFICATE OF CORRECTION

| | |
|---|---|
| PATENT NO. | : 10,571,628 B2 |
| APPLICATION NO. | : 16/193819 |
| DATED | : February 25, 2020 |
| INVENTOR(S) | : Bookbinder et al. |

It is certified that error appears in the above-identified patent and that said Letters Patent is hereby corrected as shown below:

In the Claims

In Column 21, Line 7, Claim 7, delete "wherein-the" and insert -- wherein the --, therefor.

In Column 22, Line 15 approx., Claim 20, delete "co-doped doped" and insert -- co-doped --, therefor.

Signed and Sealed this
Eighth Day of November, 2022

Katherine Kelly Vidal
*Director of the United States Patent and Trademark Office*